(12) United States Patent
Rindone

(10) Patent No.: US 6,213,611 B1
(45) Date of Patent: Apr. 10, 2001

(54) ADJUSTABLE REAR VIEW MIRROR APPARATUS

(76) Inventor: John P. Rindone, 9 Hibiscus La., Ayer, MA (US) 01432

( * ) Notice: Subject to any disclaimer, the term of this patent is extended or adjusted under 35 U.S.C. 154(b) by 0 days.

(21) Appl. No.: 09/494,167

(22) Filed: Jan. 31, 2000

(51) Int. Cl.[7] .................................................. G02B 7/182
(52) U.S. Cl. .......................... 359/871; 359/872; 359/873
(58) Field of Search ..................................... 359/871, 872, 359/873, 874, 875, 876; 248/475.1, 476, 480

(56) References Cited

U.S. PATENT DOCUMENTS

| | | |
|---|---|---|
| D. 276,992 | 1/1985 | Eichstadt . |
| 4,247,173 | 1/1981 | Vitaloni . |
| 4,363,534 | 12/1982 | Covert . |
| 4,907,871 | 3/1990 | Hou . |
| 4,911,545 | 3/1990 | Miller . |
| 4,921,337 | 5/1990 | Hou . |
| 5,483,385 | * 1/1996 | Boddy ................................... 359/841 |
| 5,831,779 | * 11/1998 | Moore ................................... 359/841 |

* cited by examiner

Primary Examiner—Mohammad Sikder

(57) ABSTRACT

A adjustable rear view mirror apparatus for viewing around objects being towed. The adjustable rear view mirror apparatus includes a mirror assembly and a mounting arm assembly. The mirror assembly has a mirror housing. The mirror housing has a front side and a back side. The front side has an opening therein to permit viewing into an interior of the mirror housing. The mirror housing has a peripheral wall integrally coupled to and extending between the front and back sides. A mirror for viewing objects rearward of the automobile is mounted in the housing and is located generally adjacent to the opening. The mounting arm assembly for mounting the mirror housing to the automobile comprises an elongate member and a sleeve. The elongate member has a peripheral wall extending between a first and a second end. The first end is mounted to the automobile. A sleeve receives the second end of the elongate member. The sleeve is fixedly mounted to the back side of the mirror housing. The elongate member is slidably insertable in the sleeve.

9 Claims, 2 Drawing Sheets

ADJUSTABLE REAR VIEW MIRROR APPARATUS

BACKGROUND OF THE INVENTION

1. Field of the Invention

The present invention relates to rear view mirrors and more particularly pertains to a new adjustable rear view mirror apparatus for viewing around objects being towed.

2. Description of the Prior Art

The use of rear view mirrors is known in the prior art. More specifically, rear view mirrors heretofore devised and utilized are known to consist basically of familiar, expected and obvious structural configurations, notwithstanding the myriad of designs encompassed by the crowded prior art which have been developed for the fulfillment of countless objectives and requirements.

Known prior art includes U.S. Pat. Nos. 4,247,173; 4,907,871; 4,911,545; 4,921,337; 4,363,534; and U.S. Des. Pat. No. 276,992.

While these devices fulfill their respective, particular objectives and requirements, the aforementioned patents do not disclose a new adjustable rear view mirror apparatus. The inventive device includes a mirror assembly and a mounting arm assembly. The mirror assembly has a mirror housing. The mirror housing has a front side and a back side. The front side has an opening therein to permit viewing into an interior of the mirror housing. The mirror housing has a peripheral wall integrally coupled to and extending between the front and back sides. A mirror for viewing objects rearward of the automobile is mounted in the housing and is located generally adjacent to the opening. The mounting arm assembly for mounting the mirror housing to the automobile comprises an elongate member and a sleeve. The elongate member has a peripheral wall extending between a first and a second end. The first end is mounted to the automobile. A sleeve receives the second end of the elongate member. The sleeve is fixedly mounted to the back side of the mirror housing. The elongate member is slidably insertable in the sleeve.

In these respects, the adjustable rear view mirror apparatus according to the present invention substantially departs from the conventional concepts and designs of the prior art, and in so doing provides an apparatus primarily developed for the purpose of viewing around objects being towed.

SUMMARY OF THE INVENTION

In view of the foregoing disadvantages inherent in the known types of rear view mirrors now present in the prior art, the present invention provides a new adjustable rear view mirror apparatus construction wherein the same can be utilized for viewing around objects being towed.

The general purpose of the present invention, which will be described subsequently in greater detail, is to provide a new adjustable rear view mirror apparatus apparatus and method which has many of the advantages of the rear view mirrors mentioned heretofore and many novel features that result in a new adjustable rear view mirror apparatus which is not anticipated, rendered obvious, suggested, or even implied by any of the prior art rear view mirrors, either alone or in any combination thereof.

To attain this, the present invention generally comprises a mirror assembly and a mounting arm assembly. The mirror assembly has a mirror housing. The mirror housing has a front side and a back side. The front side has an opening therein to permit viewing into an interior of the mirror housing. The mirror housing has a peripheral wall integrally coupled to and extending between the front and back sides. A mirror for viewing objects rearward of the automobile is mounted in the housing and is located generally adjacent to the opening. The mounting arm assembly for mounting the mirror housing to the automobile comprises an elongate member and a sleeve. The elongate member has a peripheral wall extending between a first and a second end. The first end is mounted to the automobile. A sleeve receives the second end of the elongate member. The sleeve is fixedly mounted to the back side of the mirror housing. The elongate member is slidably insertable in the sleeve.

There has thus been outlined, rather broadly, the more important features of the invention in order that the detailed description thereof that follows may be better understood, and in order that the present contribution to the art may be better appreciated. There are additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide a new adjustable rear view mirror apparatus apparatus and method which has many of the advantages of the rear view mirrors mentioned heretofore and many novel features that result in a new adjustable rear view mirror apparatus which is not anticipated, rendered obvious, suggested, or even implied by any of the prior art rear view mirrors, either alone or in any combination thereof.

It is another object of the present invention to provide a new adjustable rear view mirror apparatus which may be easily and efficiently manufactured and marketed.

It is a further object of the present invention to provide a new adjustable rear view mirror apparatus which is of a durable and reliable construction.

An even further object of the present invention is to provide a new adjustable rear view mirror apparatus which is susceptible of a low cost of manufacture with regard to both materials and labor, and which accordingly is then susceptible of low prices of sale to the consuming public, thereby making such adjustable rear view mirror apparatus economically available to the buying public.

Still yet another object of the present invention is to provide a new adjustable rear view mirror apparatus which provides in the apparatuses and methods of the prior art some of the advantages thereof, while simultaneously overcoming some of the disadvantages normally associated therewith.

Still another object of the present invention is to provide a new adjustable rear view mirror apparatus for viewing around objects being towed.

Yet another object of the present invention is to provide a new adjustable rear view mirror apparatus which includes a mirror assembly and a mounting arm assembly. The mirror assembly has a mirror housing. The mirror housing has a front side and a back side. The front side has an opening therein to permit viewing into an interior of the mirror housing. The mirror housing has a peripheral wall integrally coupled to and extending between the front and back sides. A mirror for viewing objects rearward of the automobile is mounted in the housing and is located generally adjacent to the opening. The mounting arm assembly for mounting the mirror housing to the automobile comprises an elongate member and a sleeve. The elongate member has a peripheral wall extending between a first and a second end. The first end is mounted to the automobile. A sleeve receives the second end of the elongate member. The sleeve is fixedly mounted to the back side of the mirror housing. The elongate member is slidably insertable in the sleeve.

Still yet another object of the present invention is to provide a new adjustable rear view mirror apparatus that has an adjustable mirror that pivots in all planes.

Even still another object of the present invention is to provide a new adjustable rear view mirror apparatus that replaces the need for fixed mirrors that extend beyond traditional mirrors.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be made to the accompanying drawings and descriptive matter in which there are illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein.

DESCRIPTION OF THE PREFERRED EMBODIMENT

Figure 1:
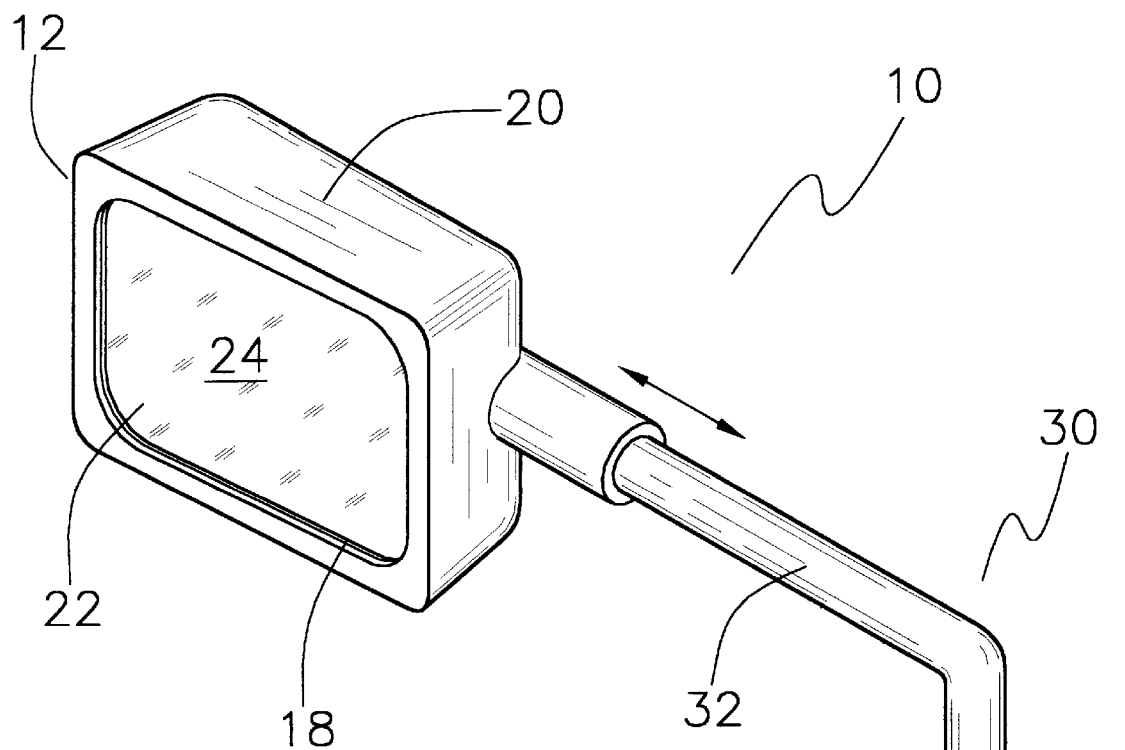
FIG. 1 is a schematic perspective view of a new adjustable rear view mirror apparatus according to the present invention.
Figure 2:
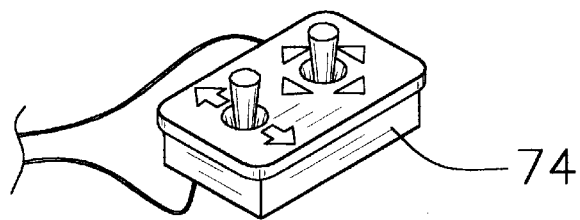
FIG. 2 is a schematic perspective view of the actuating means of the present invention.
Figure 3:
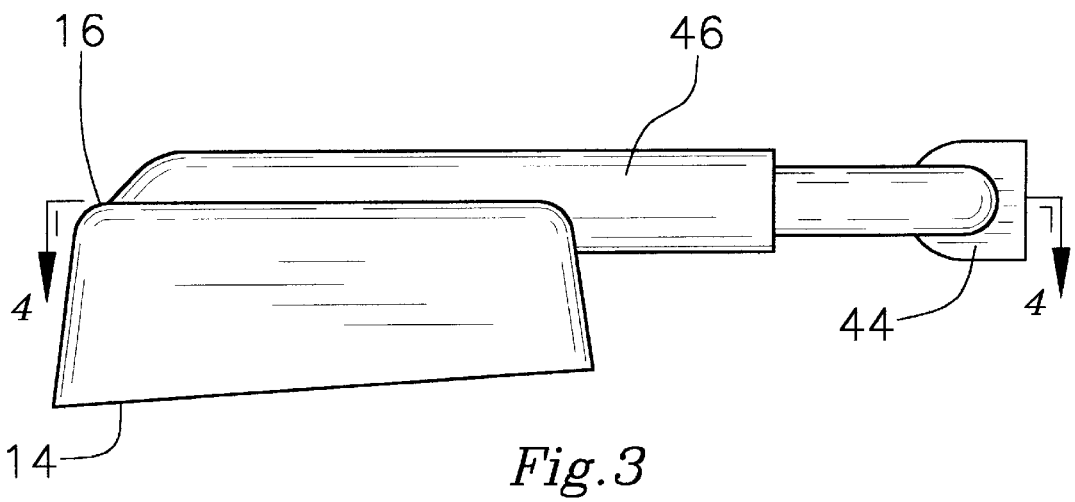
FIG. 3 is a schematic plan view of the present invention.
Figure 4:
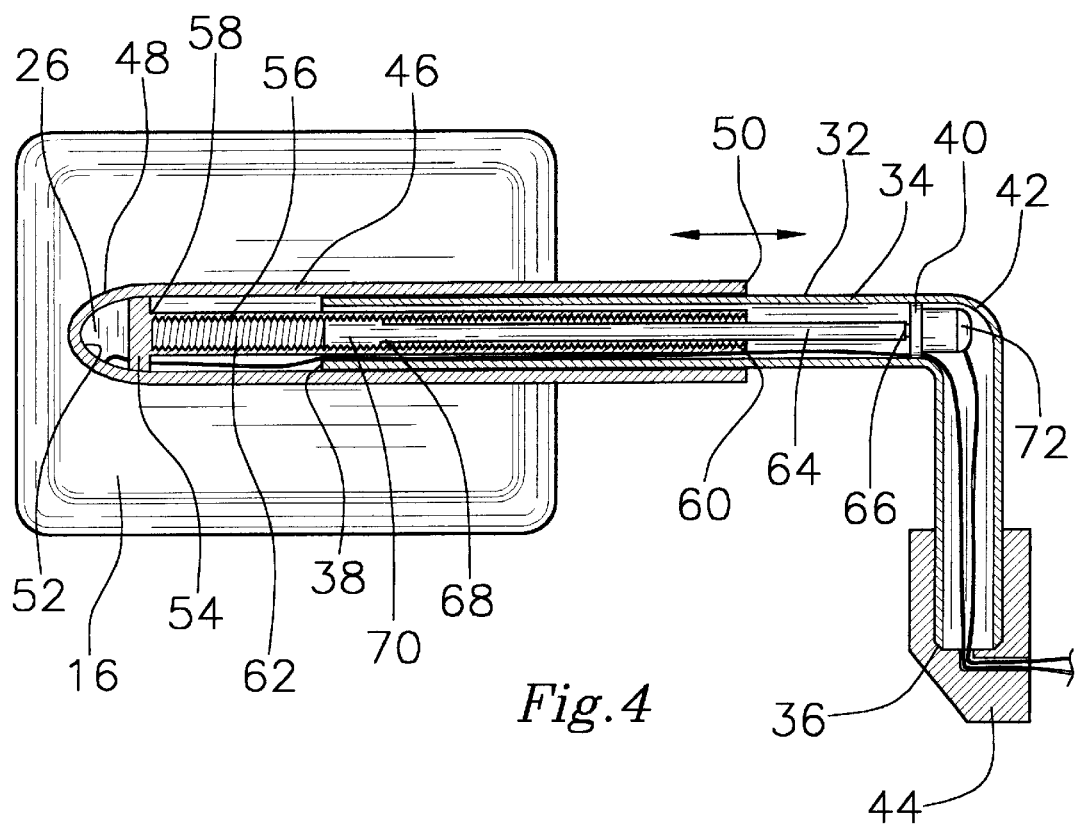
FIG. 4 is a schematic cross-sectional view taken along line 4—4 of the present invention.

With reference now to the drawings, and in particular to FIGS. 1 through 4 thereof, a new adjustable rear view mirror apparatus embodying the principles and concepts of the present invention and generally designated by the reference numeral 10 will be described.

As best illustrated in FIGS. 1 through 4, the adjustable rear view mirror apparatus 10 generally comprises a mirror assembly comprising a mirror housing 12 and mounting arm assembly 30.

The mirror housing 12 has a front side 14 and a back side 16. The front side 14 has an opening 18 therein to permit viewing into an interior of the mirror housing 12. The mirror housing 12 has a has a peripheral wall 20 integrally coupled to and extending between the front and back sides. The mirror housing has an interior. The front 14 and back sides 16 have a generally rectangular shape, and the opening 18 preferably has a generally rectangular shape.

A mirror 22 for viewing objects rearward of the automobile has a reflective side 24 and a mounting side 26. The reflective side 24 and mounting side 26 are generally planar. The mirror 22 is pivotally mounted in the interior of the mirror housing 12 such that the reflective side 24 is directed toward the opening 18. The mirror 22 is located generally adjacently to the opening 18, and preferably has a generally rectangular shape.

The mounting arm assembly 30 mounts the mirror housing to the automobile. The mounting arm assembly generally comprises an elongate member 32, a mounting block 44 and a sleeve 46.

The elongate member 32 has a peripheral wall 34 extending between a first 36 and a second end 38. The elongate member 32 is generally hollow, and the first and second ends are each open. The elongate member 32 has an internal wall 40. The internal wall 40 is in the elongate member 32, and the internal wall is substantially equidistant from the first and second ends. The elongate member 32 has a bend 42 therein, which is generally adjacent to the internal wall 40 such that the internal wall 40 is located between the bend 42 and the second end 38 of the elongate member 32. Preferably, the elongate member 32 has a generally tubular shape.

The mounting block 44 mounts the elongate member 32 to the automobile. The mounting block 44 is fixedly coupled to the first end 36 of the elongate member 32. The mounting block 44 is fixedly coupled to the automobile.

The sleeve 46 receives the second end 38 of the elongate member 32. The sleeve 46 is fixedly mounted to the back side 16 of the mirror housing 12. The sleeve 46 has a distal end 48, a proximal end 50 and an internal surface 52. The proximal end 50 has an opening therein. The second end 38 of the elongate member 32 is slidably insertable in the sleeve 46.

A mounting wall 54 in the sleeve 46 is fixedly coupled to the internal surface 52 of the sleeve 46. The mounting wall 54 is generally adjacent to the distal end 48 of the sleeve 46.

A female rod 56 has a first end 58 and a second end 60. The first end 58 is fixedly coupled to the mounting wall 54. The female rod 56 is hollow and the second end 60 of the female rod is open. An interior surface 62 of the female rod 56 is threaded. The female rod 56 has a longitudinal axis, which is generally coaxial with a longitudinal axis of the sleeve 46.

A male rod 64 has a first end 66 and a second end 68. The first end 66 of the male rod 64 is rotatably coupled to the interior wall 40 in the elongate member 32. The male rod 64 extends toward the second end 38 of the elongate member 32. The second end 38 of the male rod has a head portion 70.

The head portion 70 is threaded and has a size adapted to be selectively insertable in the female rod 56. Rotation of the male rod 64 in a first direction moves the sleeve 46 away from the bend 42 and rotation of the male rod 64 in a second direction moves the sleeve toward the bend 42.

A first motor 72 rotates the male rod 64. The first motor 72 is operationally coupled to the first end 66 of the male rod 64.

An actuating means 74 selectively controls the first motor 72 between the first rotation and the second rotation selections. The actuating means 74 is operationally coupled to the first motor 72.

A second motor, not shown, pivotally moves the mirror. The second motor is operationally coupled to the mirror 22. The second motor is operationally coupled to the actuating means 74. The actuating means 74 is adapted to selectively alter the pitch of the mirror 22 with respect to the mirror housing 12.

In use, the mirror apparatus 10 is used as any rear view mirror. When a trailer, or some other large object which obstructs rearward viewing, is being towed, the mirror housing 12 is adjustable to extend outwardly away from the vehicle such that the driver may see around the object being towed.

As to a further discussion of the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

I claim:

1. An adjustable rear view mirror viewing apparatus, said apparatus being mountable to an automobile for permitting a driver using the mirror system to see past an object being towed by an automobile, said apparatus comprising:

a mirror assembly comprising;

a mirror housing, said mirror housing having a front side and a back side, said front side having an opening therein to permit viewing into an interior of said mirror housing, said mirror housing having a peripheral wall integrally coupled to and extending between said front and back sides;

a mirror for viewing objects rearward of said automobile, said mirror being mounted in said housing and being located generally adjacent to said opening;

a mounting arm assembly for mounting said mirror housing to the automobile, said mounting arm assembly comprising:

an elongate member, said elongate member having a peripheral wall extending between a first and a second end, said first end being mountable to the automobile;

a sleeve for receiving said second end of said elongate member, said sleeve being fixedly mounted to said back side of said mirror housing, said elongate member being slidably insertable in said sleeve; and said elongate member being generally hollow, said first and second ends each being open, said elongate member having an internal wall, said internal wall being in said elongate member, said internal wall being substantially equidistant from said first and second ends, said elongate member having a bend therein, said bend being generally adjacent to said internal wall such that said internal wall is located between said bend and said second end of said elongate member.

2. The adjustable rear view mirror viewing apparatus as in claim 1, wherein:

said mirror having a reflective side and a mounting side, said reflective side and mounting side being generally planar, said mirror being pivotally mounted in said interior of said mirror housing such that said reflective side is directed toward said opening.

3. The adjustable rear view mirror viewing apparatus as in claim 1, said mounting arm assembly further comprising:

a mounting block for mounting said elongate member to said automobile, said mounting block being fixedly coupled to said first end of said elongate member, wherein said mounting block is fixedly coupled to the automobile.

4. The adjustable rear view mirror viewing apparatus as in claim 1, wherein:

said sleeve having a distal end and a proximal end, said sleeve having an internal surface, said proximal end having an opening therein;

a mounting wall in said sleeve, said mounting wall being fixedly coupled to said internal surface of said sleeve, said mounting wall being generally adjacent to said distal end of said sleeve;

a female rod, said female rod having a first end and a second end, said first end being fixedly coupled to said mounting wall, said female rod being hollow, said second end of said female rod being open, an interior surface of said female rod being threaded; and a male rod, said male rod having a first end and a second end, said first end of said male rod being rotatably coupled to said interior wall in said elongate member, said male rod extending toward said second end of said elongate member, said second end of said male rod having a head portion, said head portion being threaded and having a size adapted to being selectively insertable in said female rod.

5. The adjustable rear view mirror viewing apparatus as in claim 4, said mounting arm assembly further comprising:

a first motor for rotating said male rod, said first motor being operationally coupled to said first end of said male rod.

6. The adjustable rear view mirror viewing apparatus as in claim 5, further comprising:

an actuating means for selectively controlling said first motor between said first rotation and said second rotation, said actuating means being operationally coupled to said first motor.

7. The adjustable rear view mirror viewing apparatus as in claim 6, further comprising:

a second motor for pivotally moving said mirror, said second motor being operationally coupled to said mirror, said second motor being operationally coupled to said actuating means.

8. An adjustable rear view mirror viewing system for permitting a driver using the mirror system to see past a an object being towed by an automobile, said system comprising:
- a mirror assembly comprising;
  - a mirror housing, said mirror housing having a front side and a back side, said front side having an opening therein to permit viewing into an interior of said mirror housing, said mirror housing having a having a peripheral wall integrally coupled to and extending between said front and back sides, said mirror housing having an interior, said front and back sides having a generally rectangular shape, said opening having a generally rectangular shape;
  - a mirror for viewing objects rearward of said automobile, said mirror having a reflective side and a mounting side, said reflective side and mounting side being generally planar, said mirror being pivotally mounted in said interior of said mirror housing such that said reflective side is directed toward said opening, said mirror being located generally adjacently to said opening, said mirror having a generally rectangular shape;
- a mounting arm assembly for mounting said mirror housing to the automobile, said mounting arm assembly comprising:
  - an elongate member, said elongate member having a peripheral wall extending between a first and a second end, said elongate member being generally hollow, said first and second ends each being open, said elongate member having an internal wall, said internal wall being in said elongate member, said internal wall being substantially equidistant from said first and second ends, said elongate member having a bend therein, said bend being generally adjacent to said internal wall such that said internal wall is located between said bend and said second end of said elongate member, said elongate member having a generally tubular shape;
  - a mounting block for mounting said elongate member to said automobile, said mounting block being fixedly coupled to said first end of said elongate member;
  - a sleeve for receiving said second end of said elongate member, said sleeve being fixedly mounted to said back side of said mirror housing, said sleeve having a distal end and a proximal end, said sleeve having an internal surface, said proximal end having an opening therein, said second end of said elongate member being slidably insertable in said sleeve;
  - a mounting wall in said sleeve, said mounting wall being fixedly coupled to said internal surface of said sleeve, said mounting wall being generally adjacent to said distal end of said sleeve;
  - a female rod, said female rod having a first end and a second end, said first end being fixedly coupled to said mounting wall, said female rod being hollow, said second end of said female rod being open, an interior surface of said female rod being threaded, said female rod having a longitudinal axis being generally coaxial with a longitudinal axis of said sleeve;
  - a male rod, said male rod having a first end and a second end, said first end of said male rod being rotatably coupled to said interior wall in said elongate member, said male rod extending toward said second end of said elongate member, said second end of said male rod having a head portion, said head portion being threaded and having a size adapted to being selectively insertable in said female rod, wherein rotation of said male rod in a first direction moves said sleeve away from said bend and rotation of said male rod in a second direction moves said sleeve toward said bend;
  - a first motor for rotating said male rod, said first motor being operationally coupled to said first end of said male rod;
- an actuating means for selectively controlling said first motor between said first rotation and said second rotation, said actuating means being operationally coupled to said first motor; and
- a second motor for pivotally moving said mirror, said second motor being operationally coupled to said mirror, said second motor being operationally coupled to said actuating means, wherein said actuating means is adapted to selectively alter the pitch of said mirror with respect to said mirror housing.

9. An adjustable rear view mirror viewing apparatus for an automobile, said apparatus comprising:
- a mirror assembly comprising;
  - a mirror housing having a front side and a back side, said front side having an opening therein, said mirror housing having a peripheral wall extending between said front and back sides;
  - a mirror mounted on said housing in said opening;
- a mounting arm assembly for mounting said mirror housing to the automobile, said mounting arm assembly comprising:
  - an elongate member having a peripheral wall extending between a first and a second end, said first end being mountable to the automobile, said elongate member having a generally hollow interior, said second end having an opening into said generally hollow interior;
  - a sleeve mounted to said back side of said mirror housing, said sleeve having a distal end and a proximal end, said sleeve having a generally hollow interior, said proximal end having an opening into said interior, said elongate member being slidably inserted in the interior of said sleeve;
  - a first member mounted in the interior of said sleeve, said first member having a generally hollow interior with a threaded interior surface, said first member having a first end and a second end, said first end being coupled to said sleeve, said second end of said first rod being open into the interior of said first member; and
  - a second member having a first end and a second end, said first end of said second member being rotatably mounted in the interior of said elongate member, said second member extending toward said second end of said elongate member, said second member having a portion with a threaded exterior surface engaging the threaded interior surface of said first member such that rotation of said second member moves said first member and said sleeve in an axial direction with respect to said second member; and
- a motor mounted in the interior of said elongate member and coupled to the second end of said second member for rotating said second member.

* * * * *